US012442685B2

(12) United States Patent
Otter et al.

(10) Patent No.: US 12,442,685 B2
(45) Date of Patent: Oct. 14, 2025

(54) RADIOMETRIC CALIBRATION METHOD AND DEVICE

(71) Applicant: Nederlandse Organisatie voor toegepast-natuurwetenschappelijk onderzoek TNO, 's-Gravenhage (NL)

(72) Inventors: Gerard Christiaan Jurjen Otter, Pijnacker (NL); James Peter Robert Day, Berkel en Rodenrijs (NL); Niels Dijkhuizen, Zoetermeer (NL); Ralph Claude Snel, Hilversum (NL); Marcela Pelica Pascoa, Eindhoven (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 16 days.

(21) Appl. No.: 18/265,559

(22) PCT Filed: Dec. 6, 2021

(86) PCT No.: PCT/NL2021/050737
§ 371 (c)(1),
(2) Date: Jun. 6, 2023

(87) PCT Pub. No.: WO2022/124886
PCT Pub. Date: Jun. 16, 2022

(65) Prior Publication Data
US 2024/0027268 A1    Jan. 25, 2024

(30) Foreign Application Priority Data
Dec. 7, 2020   (EP) ...................................... 20212239

(51) Int. Cl.
*G01J 3/02*  (2006.01)
*G01J 1/42*  (2006.01)

(52) U.S. Cl.
CPC ............... *G01J 3/0297* (2013.01); *G01J 1/42* (2013.01); *G01J 3/0205* (2013.01); *G01J 2001/4266* (2013.01)

(58) Field of Classification Search
CPC .... G01J 3/02; G01J 3/0297; G01J 3/45; G01J 3/10; G01J 3/36; G01B 9/02; G01N 21/35; G01N 21/25; G01N 21/255
See application file for complete search history.

(56) References Cited

U.S. PATENT DOCUMENTS 6,597,457 B1   7/2003  Silvergate et al.
6,795,188 B2 * 9/2004  Ruck .......................... G01J 9/00
                                              356/402

(Continued)

OTHER PUBLICATIONS

European Patent Office, International Search Report in corresponding International Application No. PCT/NL2021/050737, dated Feb. 25, 2022 (3 pages).

(Continued)

*Primary Examiner* — Abdullahi Nur
(74) *Attorney, Agent, or Firm* — Leydig, Voit & Mayer, Ltd.

(57) ABSTRACT

A method and device (10) for making a calibrated measurement of light from an object (E). In a first measurement window (W1), object light ($L_E$) is received from the object (E) onto a beam splitter (11) which splits the light into a signal path (Ps) and a reference path (Pr). A first signal ($S1=T \cdot L_E \cdot Hs$) is measured by a signal detection element (15s) in the signal path (Ps). A second signal ($S2=R \cdot L_E \cdot Hr$) is measured by a reference detection element (15r) in the reference path (Pr). In a second measurement window (W2), calibration light ($L_C$) is received onto the beam splitter (11). A third signal ($S3=R \cdot L_C \cdot Hs$) is measured by the signal detection element (15s) in the signal path (Ps). A fourth signal ($S4=T \cdot L_C \cdot Hr$) is measured by the reference detection (Continued)

element (15r) in the reference path (Pr). A measurement value of the object light ($L_E$) is determined based on the measured signals (S1,S2,S3,S4).

20 Claims, 3 Drawing Sheets (56) References Cited

U.S. PATENT DOCUMENTS

| | | | |
|---|---|---|---|
| 2009/0219597 A1* | 9/2009 | Myrick | G06E 3/001 359/107 |
| 2010/0292581 A1* | 11/2010 | Howard | G01J 3/0205 356/326 |
| 2013/0119277 A1 | 5/2013 | Atzler et al. | |
| 2018/0217053 A1 | 8/2018 | Deguchi et al. | |
| 2018/0224334 A1 | 8/2018 | O'Rourke et al. | |

OTHER PUBLICATIONS

Marcel R. Dobber et al., "Ozone Monitoring Instrument Calibration," IEEE Transactions on Geoscience and Remote Sensing, vol. 44, No. 5, pp. 1209-1238 (May 2006).

Akihiko Kuze et al., "Thermal and Near Infrared Sensor for Carbon Observation Fourier-transform Spectrometer on the Greenhouse Gases Observing Satellite for Greenhouse Gases Monitoring," Applied Optics, vol. 48, No. 35, pp. 6716-6733 (Dec. 10, 2009).

Young-Min Cho et al., "Characteristics of COMS Meteorological Imager," Proc. of SPIE, vol. 6361, Archive No. 000109317, pp. 63611G-1 to 63611G-8.

Marcell R. Dobber et al., "Ozone Monitoring Instrument Calibration," IEEE Transactions on Geoscience and Remote Sensing, vol. 44, No. 5, May 2006.

European Patent Office, Examination Report in corresponding European Application No. 21820727.2 dated Jun. 26, 2025.

* cited by examiner

RADIOMETRIC CALIBRATION METHOD AND DEVICE

CROSS-REFERENCE TO RELATED APPLICATIONS

This patent application is a U.S. National Phase of PCT International Application No. PCT/NL2021/050737, filed Dec. 6, 2021, which claims priority to European Application No. 20212239.6, filed Dec. 7, 2020, which are both expressly incorporated by reference in their entireties, including any references contained therein.

TECHNICAL FIELD AND BACKGROUND

The present disclosure relates to radiometric methods and devices for making a calibrated measurement of light from an object or scene.

Instruments for Earth Observation (EO) from space that monitor in the UV, visible, NIR and SWIR wavelength ranges typically use the Sun as a radiometric calibration reference. To perform this calibration, the instrument, e.g., measures the Sun spectral irradiance (flux per surface area per unit wavelength) with the same optical path as it measures the Earth spectral radiance (spectral irradiance per solid angle). For example, this measurement can be done with a calibration subsystem having a diffuser, which converts the Sun irradiance into a radiance comparable to the Earth radiance. This calibration subsystem is normally put in front of the main instrument in order to ensure that the Earth light and diffused Sunlight traverse the same optical path. For EO instruments with a large entrance pupil and/or large field of view, the diffuser in the calibration subsystem can be very large. Furthermore, the calibration subsystem typically needs a mechanism to remove the diffuser from the optical path during Earth observation, which may add extra risk to the instrument. The combination of the large diffuser and mechanism can lead to a bulky unit that can take up a significant fraction of the total instrument volume and mass. Lastly, this calibration approach is typically predicated on the assumption that the diffusion characteristics of the diffuser do not degrade during the lifetime of the instrument. This assumption may not hold for current diffuser technology in the harsh environment, in particular outside the Earth's atmosphere where the diffuser is subject to high energy photon and particle radiation. Although secondary diffusers can be used to mitigate this effect, this approach also adds additional mass and volume to the calibration unit.

Accordingly there is a need for improvements in performing calibrated measurements, in particular for an improved in-orbit radiometric measurement or calibration device and methods of using such device.

SUMMARY

Aspects of the present disclosure relate to methods and devices for making a calibrated measurement of light from an object or scene such as the Earth. In a first measurement window a beam of object light is received from the object onto a beam splitter of the device. This causes the object light to be split into a first light beam traveling along a signal path and a second light beam traveling along a reference path. By projecting the first light beam via the signal path onto a respective signal detection element, a first signal can be measured. By projecting the second light beam via the reference path onto a respective reference detection element, a second signal can be measured. In a second measurement window, a beam of calibration light is received onto the beam splitter. This causes the calibration light to be split into a third light beam traveling along the signal path and a fourth light beam traveling along the reference path. By projecting the third light beam via the signal path onto the respective signal detection element, a third signal can be measured. By projecting the fourth light beam via the reference path onto the respective reference detection element, a fourth signal can be measured. As described herein at least one measurement value of the object light can be determined, e.g. calculated, based on a combination of the measured at least four signals. Also further signals can be measured. For example, the calibration light can originate from a diffuser, whose characteristic can be determined by comparing a direct signal from a calibration light source, such as the Sun, bypassing the diffuser.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
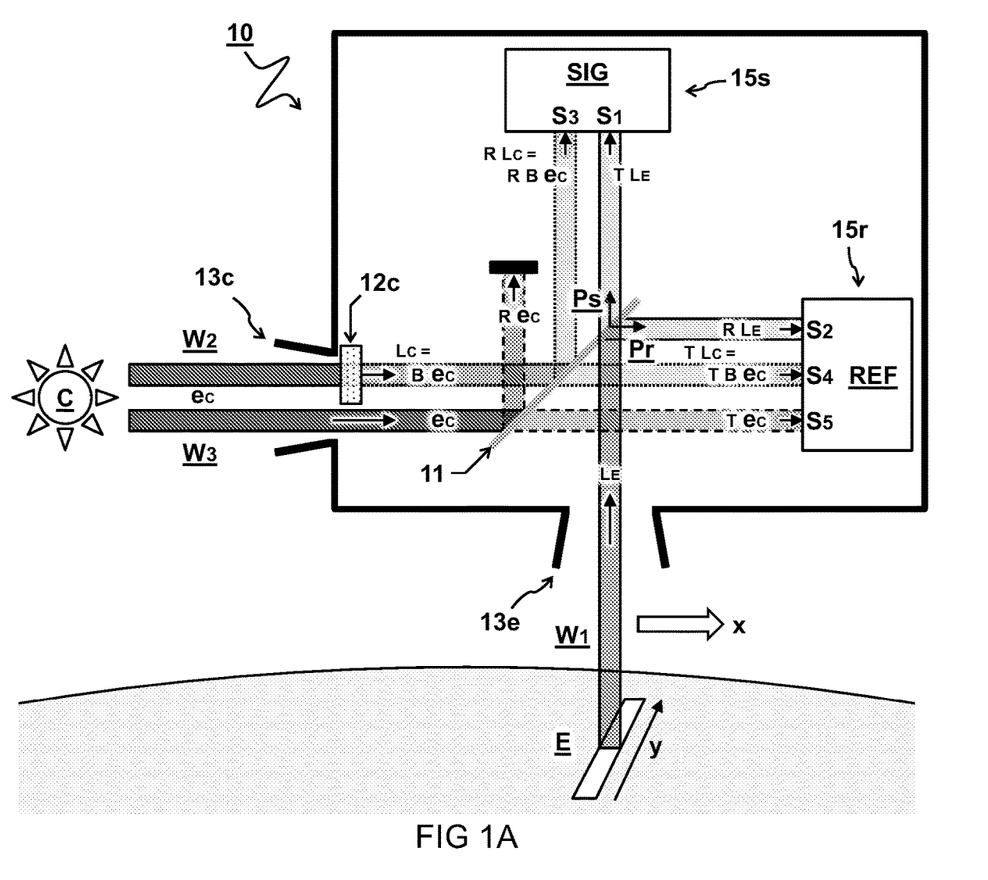
FIG. 1A illustrates a measurement and/or calibration device taking measurements of an object or scene in relation to a calibration light source.

FIG. 1A illustrates a (radiometry) device 10 taking measurements of an object or scene (E) in relation to a calibration light source (C). Some aspects of the present disclosure can be embodied as a method or device (10) for making a calibrated measurement of light from an object E. Aspects can also be embodied as a (non-transitory) computer-readable medium storing instructions that, when executed by one or more processors, cause a device to perform the methods as described herein.

In some embodiments, (a beam of) object light $L_E$ is received from the object E onto a beam splitter 11. For example, this causes the object light $L_E$ to be split into a first light beam $T \cdot L_E$ traveling along a signal path "Ps" and a second light beam $R \cdot L_E$ traveling along a reference path "Pr". In one embodiment, a first signal $S1=T \cdot L_E \cdot Hs$ is measured by projecting the first light beam $T \cdot L_E$ via the signal path "Ps" onto a respective signal detection element 15s. In another or further embodiment, a second signal $S2=R \cdot L_E \cdot Hr$ is measured by projecting the second light beam $R \cdot L_E$ via the reference path "Pr" onto a respective reference detection element 15r. For example, the first and/or second signals S1,S2 are measured during a first measurement window W1.

In some embodiments, (a beam of) calibration light $L_C$ is received (e.g. directly or indirectly from a calibration light source C) onto the beam splitter 11. For example, this causes the calibration light $L_C$ to be split into a third light beam $R \cdot L_C$ traveling along the signal path "Ps" and a fourth light beam $T \cdot L_C$ traveling along the reference path "Pr", In one embodiment, a third signal $S3=R \cdot L_C \cdot Hs$ is measured by projecting the third light beam $R \cdot L_C$ via the signal path "Ps" onto the respective signal detection element 15s. In another or further embodiment, a fourth signal $S4=T \cdot L_C \cdot Hr$ is measured, by projecting the fourth light beam $T \cdot L_C$ via the reference path "Pr" onto the respective reference detection element 15r. For example, the third and/or fourth signals S3,S4 are measured during a second measurement window W2, which is preferably different from (not overlapping with) the first measurement window W1.

In some embodiments, a measurement value of the object light $L_E$ is determined. Preferably, the measurement value is determined based on at least a combination of the measured first through fourth signals S1,S2,S3,S4; and possibly further signals. In one embodiment, the measurement value of the object light $L_E$ is determined based at least on a combination, e.g. ratio, of the first signal $S1=T \cdot L_E \cdot Hs$ and the third signal $S3=R \cdot L_C \cdot Hs$. As will be appreciated, the combination of S1 and S3 can be used to cancel a response Hs of the signal path "Ps", e.g. response or sensitivity of the signal detection element 15s and/or influence of optical components along the signal path "Ps", e.g. efficiency and/or loss along the path, which may appear in both signals. For example, the measurement value of the object light $L_E$ can be expressed as $$L_E = L_C \frac{R}{T} \frac{S_1}{S_3}$$

In some embodiments, the object light $L_E$ represents spectral radiance of the object E, e.g. radiant flux of the object light received per unit area per unit solid angle per unit wavelength. For example, the spectral radiance of the scene is received from a respective solid angle (corresponding to a respective part of the object or scene) onto an area representing the entrance pupil of the detection system which is projected onto the respective detection element. In other or further embodiments, the calibration light $L_C$ represents spectral radiance of the calibration light source S, e.g. radiant flux of the calibration light received per unit area per unit solid angle per unit wavelength. Preferably, the calibration light source is a diffuse light source and/or light from the calibration light source is received via a diffuser to provide the calibration light $L_C$ as homogeneous and/or isotropic radiance filling the entrance pupil and/or field of view of the detection system. It is noted that, in general, the calibration light source does not need to be diffuse per se. Typically, it is sufficient if the light source fills the etendue of the detection system—i.e. both the entrance pupil and the field.

In some embodiments, the measurement value of the object light $L_E$ is determined based at least on a combination of the first signal $S1=T \cdot L_E \cdot Hs$, the third signal $S3=R \cdot L_C \cdot Hs$, a reference value for the calibration light $L_C$, and a beam splitting ratio R/T of a reflection R and transmission T of the beam splitter 11. In one embodiment, the beam splitting ratio R/T of the beam splitter 11 is predetermined. In another or further embodiment, the beam splitting ratio R/T is determined based on a combination of the measured first through fourth signals S1,S2,S3,S4. In one embodiment, the beam splitting ratio R/T is determined based on at least a combination, e.g. ratio, of the second signal $S2=R \cdot L_E \cdot Hr$ and the first signal $S1=T \cdot L_E \cdot Hs$. As will be appreciated, the combination of S2 and S1 can be used to cancel the value of the object light $L_E$ measured in the reference and signal paths, respectively. In another or further embodiment, the beam splitting ratio R/T is determined based on at least a combination, e.g. ratio, of the third signal $S3=R \cdot L_C \cdot Hs$ and the fourth signal $S4=T \cdot L_C \cdot Hr$. As will be appreciated, the combination of S3 and S4 can be used to cancel the value of the calibration light $L_C$ measured in the signal and reference paths, respectively.

In a preferred embodiment, wherein the object light $L_E$ is received onto a first side (face) of the beam splitter 11 and the calibration light $L_C$ is received onto a second side of the beam splitter 11, opposite the first side. In other words, the object light $L_E$ and calibration light $L_C$ are received from opposite sides of the beam splitter 11, as illustrated. In some embodiments, the beam splitter 11 is provided with a beam-splitting coating exclusively on the one side with an optional anti-reflection on the other side. So, although the calibration light can strike the second side of the beam splitter 11 first, this does not necessarily mean that the beam is split at this interface. In one embodiment, the object light $L_E$ in the signal path "Ps" is the part which is transmitted through the beam splitter 11, whereas the object light $L_E$ in reference path "Pr" is the part which is reflected from the beam splitter 11. Conversely, the calibration light $L_C$ in the signal path "Ps" is the part which is reflected by the beam splitter 11, whereas the calibration light $L_C$ in reference path "Pr" is the part which is transmitted through the beam splitter 11. The situation of the signal path "Ps" and reference path "Pr" can also be reversed. As will be most appreciated, a combination of the preceding combined signals can be used to cancel also the respective responses Hs and Hr of the signal path "Ps" and reference path "Pr". For example, the beam splitting ratio R/T can be expressed using $$\sqrt{\frac{S_2\,S_3}{S_1\,S_4}} = \sqrt{\frac{L_E RH_r\ L_C RH_s}{L_E TH_S\ L_C TH_r}} = \frac{R}{T}$$

Also other combination of the signals can be used depending on which parts of the respective light $L_C$, $L_E$ are transmitted/reflected into which path "Ps" and/or "Pr".

In some embodiments, the calibration light $L_C$ is received from a light source having known spectral radiance and/or spectral irradiance. For example, a calibrated light source can be used. In other or further embodiments, the measurement value of the object light $L_E$ is determined relative to the calibration light $L_C$. For example, the object light $L_E$ originates from an object or scene that is illuminated by a reference or calibration light source C which is directly or indirectly used to also generate the calibration light $L_C$. In other words, the same light source can be used to both illuminate the object or scene (resulting in the object light $L_E$) as well as provide the calibration light $L_C$. As will be appreciated, information about the object or scene such as reflection and/or absorption can be inferred from the amount of light that is received relative to the amount of light which was used for illumination. For example, this can also be used for determining spectroscopic information about the object or scene.

In some embodiments, the calibration light $L_C$ is received from, or via, a diffuser 12. For example, the diffuser 12 is illuminated by direct reference light $e_c$ from a calibration light source C to generate diffused reference light $B \cdot e_c$ which is used as the calibration light $L_C$. In one embodiment, the diffused reference light $B \cdot e_c$ is received onto the beam splitter 11 causing the diffused reference light $B \cdot e_c$ to be split into the third light beam $R \cdot L_C = R \cdot B \cdot e_c$ traveling along the signal path "Ps" and the fourth light beam $T \cdot L_C = T \cdot B \cdot e_c$ traveling along the reference path "Pr".

In some embodiments, the diffuser 12 has a predetermined diffusion characteristic, e.g. quantified by a Bidirectional Scattering Distribution Function (BSDF), e.g. Bidirectional Transmittance Distribution Function (BTDF) and/or Bidirectional Reflectance Distribution Function (BRDF). In one embodiment, the measurement value of the object light $L_E$ is determined based on at least a combination of the measured first through fourth signals S1,S2,S3,S4, a value of the direct reference light $e_c$, and a diffusion characteristic "B" of the diffuser 12. For example, this can be expressed in terms of the BTDF as $$L_E = e_C BTDF \sqrt{\frac{S_1 S_2}{S_3 S_4}}$$

So, the (at least one) measurement value of the object light $L_E$ (e.g. at a specific wavelength) can be calculated using a formula where each of the measured first through fourth signals (S1,S2,S3,S4) enter as functional parameters. In other words, the (numerical) measurement value of the object light ($L_E$) can be calculated as function of at least each of the measured first through fourth signals (S1,S2,S3,S4).

Unfortunately, if cannot always be assumed that the diffusion characteristic remains the same over a lifetime of the diffuser 12. Accordingly, in some preferred embodiments, the diffusion behavior is determined, e.g. monitored, by measurement using the detector 10 itself. In some embodiments, direct reference light $e_c$ is received directly from the calibration light source C onto the beam splitter 11, bypassing the diffuser 12. For example, this causes the direct reference light $e_c$ to be split into a fifth light beam $T \cdot e_c$ traveling along the reference path "Pr" (and a sixth light beam $R \cdot e_c$ traveling along the signal path "Ps" which could additionally or alternatively be used). In one embodiment, a fifth signal $S5 = Hr \cdot T \cdot e_c$ is measured by projecting the fifth light beam $T \cdot e_c$ via the reference path "Pr" onto the respective reference detection element 15r. For example, the fifth signal S5 is measured during a third measurement window W3, which is preferably different from (not overlapping with) the first and second measurement windows W2. In another or further embodiment, the diffusion characteristic "B" of the diffuser 12 is determined based on the fourth and fifth signals S4,S5. For example, this can be expressed in terms of the BTDF as $$BTDF = \frac{S_4}{S_5}$$

While it is preferable to measure the diffusion characteristic "B" using signals S4,S5 traveling along the reference path "Pr", also other or further combination of signals could be used to determine the diffusion characteristic "B". For example, if the sixth light beam $R \cdot e_c$ is continued along the signal path "Ps" (not shown), this could be projected onto the signal detection element 15s to detect another or further signal $S6 = R \cdot e_c \cdot Hs$ which can be compared to the third signal third signal $S3 = R \cdot B \cdot e_c \cdot Hs$, e.g.

$$BTDF = \frac{S_3}{S_6}$$

In some embodiments, the measurement value of the object light $L_E$ is determined based on at least a combination of the measured first through fifth signals S1,S2,S3,S4,S5 and a value of the direct reference light $e_c$. For example, this can be expressed as $$L_E = e_C \frac{S_4}{S_5} \sqrt{\frac{S_1 S_2}{S_3 S_4}}$$

So, the fifth signal (S5) may also enter the formula and the measurement value of the object light ($L_E$) can be (numerically) calculated as function also of the fifth signal (S5). In one embodiment, the value, e.g. spectral irradiance, of the direct reference light $e_c$ is a predetermined or separately measured value. In another or further embodiment, the measurement value of the object light $L_E$ is determined relative to the value of the direct reference light $e_c$.

Figure 1B:
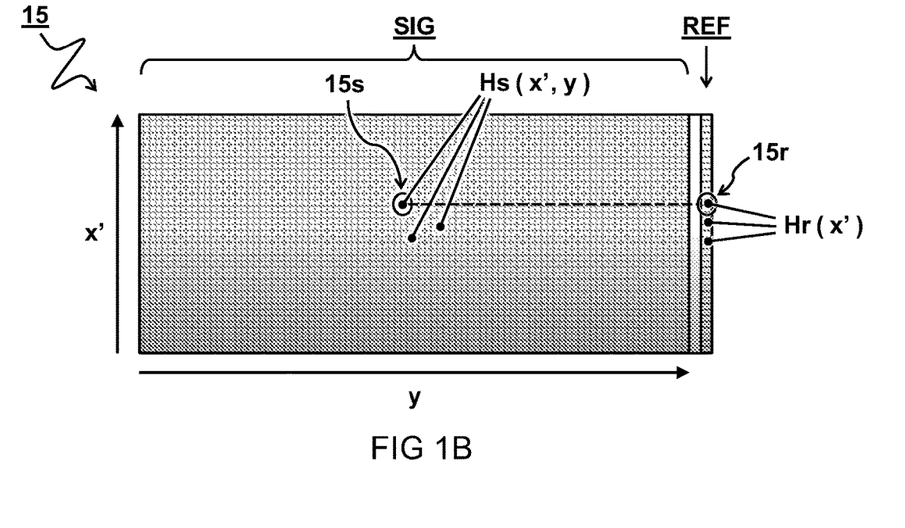
FIG. 1B illustrates a sensor array for use in the device

FIG. 1B illustrates a sensor array 15, e.g. for use in the device 10 of FIG. 1A.

In some embodiments, the signal detection element 15s is formed by a respective pixel of a sensor array 15. For example, the first light beam $T \cdot L_E$ is projected onto the sensor array 15 as an image of the object E. In particular, the projected image can be spatially resolved along one or more directions x,y. In one embodiment, the first light beam $T \cdot L_E$ is projected as an image of the object E along a first direction y and as an image of an entrance pupil along a second direction x', transverse to the first direction y. In other words, object E can be spatially resolved along the first direction only. In other or further embodiments, the first light beam T·$L_E$ is projected onto the sensor array 15 as a spectrum of the object E. In particular, the spectrum can be spatially resolved along at least one direction, e.g. the second direction x'. In a preferred embodiment, spatial projection of an image of the object E, e.g. along a first direction y, is combined with spectrally resolving the light, e.g. along the second direction x', for each image position along the first direction y.

For example, the measurement device 10 comprises a projection system in the signal path "Ps" (not shown here), preferably using reflective optics (less wavelength dependent), with a first object distance in the first direction, which is configured to coincide with the object E (e.g. infinity), and a second object distance in the second direction, which is configured to coincide with the entrance pupil (effectively scrambling the spatial information). In one embodiment, the measurement device 10 is configured to sweep its view of the source along the second direction, e.g. a flight direction x as shown in FIG. 1A, for taking image slices of the source. In another or further embodiment, the first light beam T·$L_E$ is spectrally resolved along the second direction x'. For example, the measurement device 10 comprises spectrally resolving elements (not shown here) configured to selectively pass different wavelengths of the light onto different pixels along the second direction x'. In a preferred embodiment, the spectrally resolving elements are formed by a set of (contiguous) spectral bandpass filters whose pass band changes for each row of pixels on the detector. Alternatively, or in addition, this could also be done using a spectrometer.

Typically, for each wavelength of the first light beam T·$L_E$ being measured as a first signal S1=T·$L_E$·Hs, a corresponding wavelength of the second light beam R·$L_E$ is measured as a second signal S2=R·$L_E$·Hr and/or a corresponding wavelength of the third light beam R·$L_C$ is measured as a third signal and/or S3=R·$L_C$·Hs and/or a corresponding wavelength of the fourth light beam T·$L_C$ is measured as a fourth signal S4=T·$L_C$·Hr. For example, to determine a calibrated measurement value of the object light ($L_E$) at a specific wavelength, a measurement of each of the signals may be performed (exclusively) at that wavelength, or at least including that wavelength. Accordingly, it will be understood that the beam splitter 11 both transmits as well as reflects at least some of the light for each of the wavelengths being measured. For example, the beam splitting ratio R/T is at least between 0.1-10 for all wavelengths of light being measured, preferably between 0.2-5, more preferably between 0.5-2, most preferably between 0.9-1.1. The closer the beam splitting ratio is to one, the more even the light may be distributed for equal measurements.

In some embodiments, the beam splitting ratio R/T, at least for all wavelengths being measured, is (essentially) independent, or at least minimally dependent, on the wavelength of the light. For example, the beam splitting ratio R/T varies less than 50% over the range of wavelengths being measured, preferably less than 20%, more preferably less than 10%, or even less than 1%. For example, a beam splitter can be used with a metallic coating that partially transmits and partially reflects light, independent of wavelength. Also other achroic (non-dichroic) beam splitters can be used. Using a beam splitter have a very low or substantially no wavelength dependence, calibration of different wavelengths may be combined, e.g. using a combined reference detector. In some embodiments, the reference detection element 15r is formed by a respective pixel of the same or another sensor array 15, wherein the second light beam R·$L_E$ is projected onto the sensor array 15 as a diffused image of the object E. For example, the second light beam R·$L_E$ includes the combined light from both first and second directions. For example, the measurement device 10 comprises a projection system in the reference path "Pr" (not shown here), with an object distance which is configured to coincide with the entrance pupil in both directions. Alternatively, or additionally, a second diffuser (not shown here) can be disposed in the reference path "Pr". In a preferred embodiment, the reference path "Pr" is fed back into the signal path "Ps" as a virtual field point i.e. outside the nominal field of view of the signal path. This enables a single sensor array 15 to monitor both the signal and reference path simultaneously. For example, the reference path contains an additional diffuser in order to diffuse a direct irradiance to fill the entrance pupil of the signal path. As the additional diffuser can be placed after the beam splitter 11, a separate monitoring path for this additional diffuser is not needed.

In some embodiments, the reference detection element 15r is formed by a respective pixel along a column (or row) of pixels of the sensor array 15. For example, the second light beam R·$L_E$ is spectrally resolved along the column of pixels. In one embodiment, the first and/or third signals S1,S3 measured by a respective signal detection element 15s for a respective wavelength of the object light $L_E$ are combined with the second, fourth, and/or fifth signals S2,S4, S5 measured by a respective reference detection element 15r for the same wavelength of the calibration light $L_C$. For example, this may correspond to using pixels from the same row of the sensor array 15 (or at least corresponding to the same spectral filter). Advantageously, this may allow determining the relative value for the object light $L_E$ relative to the calibration light $L_C$ for respective wavelengths. For example, this may result in a reflection or absorption spectrum of the object E.

In preferred embodiments, as illustrated, the Sun is used as a calibration light source C. Preferably, when using the Sun as a calibration light source, the light is diffused as it typically only has a field angle of half of a degree, which may be smaller than the field of view of the instrument. Also other light sources can be used. In some embodiments, the object light $L_E$ originates from the Earth as the object E. Also other objects or scenes can be measured. For example, the object light $L_E$ is used to determine a radiance of the Earth and/or atmosphere, optionally in relation to the a radiance or irradiance of the Sun. Accordingly, some aspects of the present disclosure can be embodied as a detector 10 that is used for aerial observation, e.g. as part of an airplane; or satellite in orbit above the Earth. It can also be envisaged that the detector 10 is used as a calibration unit, e.g. to calibrate another detector (not shown) such as a spectral imager. Also other applications can be envisaged.

Figure 2A:
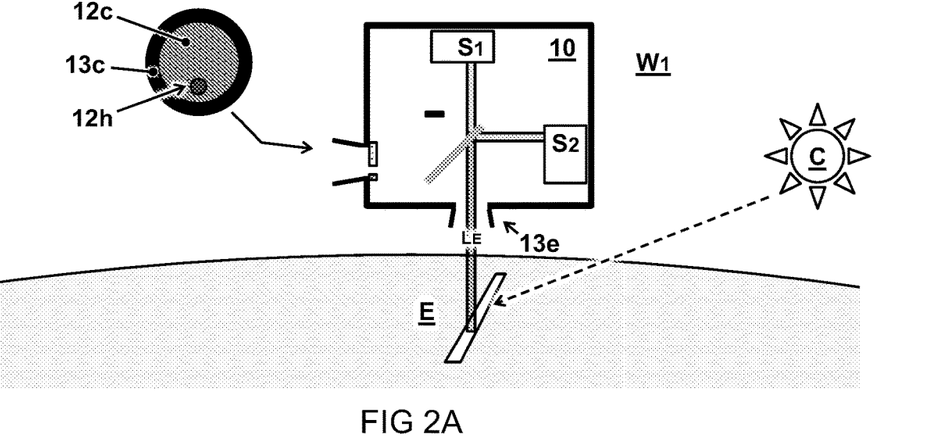
FIGS. 2A-2C illustrate the device measuring signals in respective measurement window.
Figure 2B:
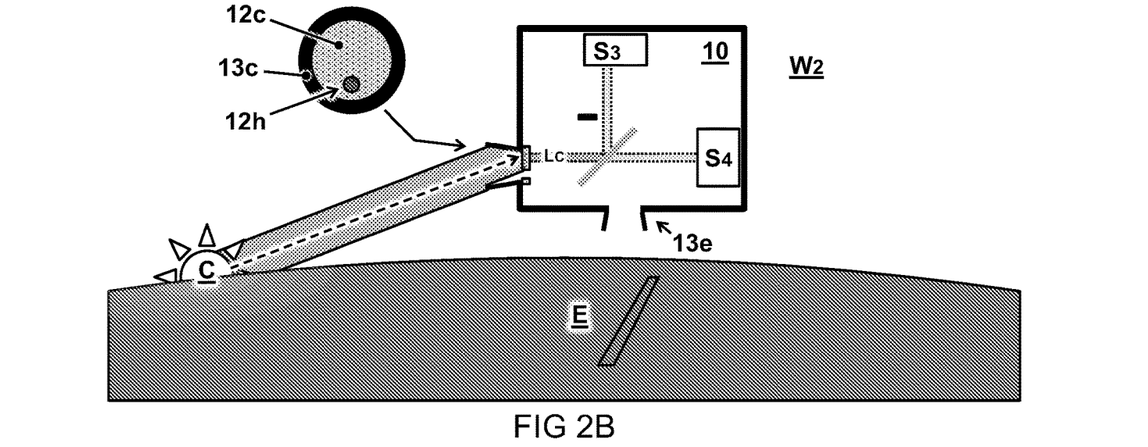
Figure 2C:
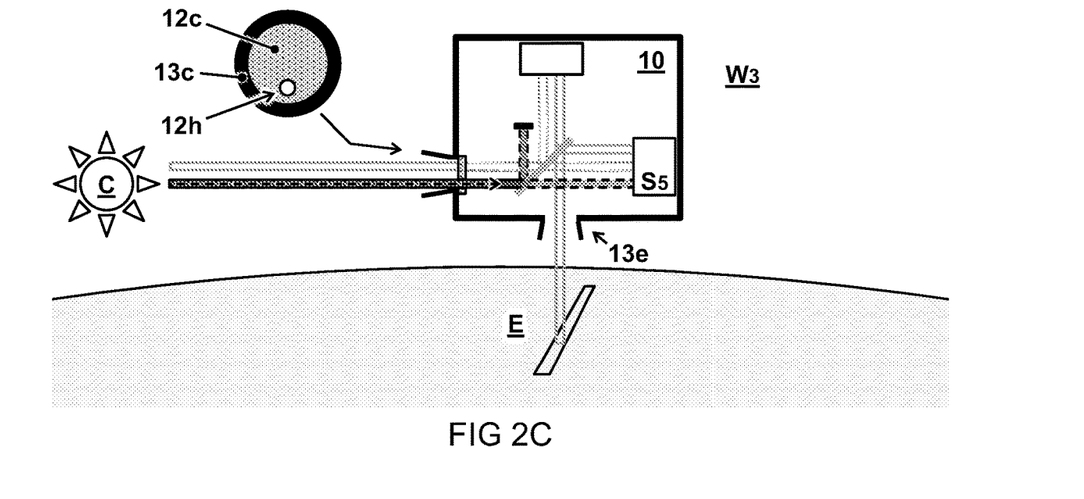

FIGS. 2A-2C illustrate a device 10 measuring signals S1,S2; S3,S4; S5 in respective measurement windows W1,W2,W3.

In some embodiments, the measurement device 10 comprises at least two (separate) light entrances. In one embodiment, a first light entrance is used for receiving the object light $L_E$ from the object E. In another or further embodiment, a second light entrance is used for receiving light from the calibration light source C. In a preferred embodiment, the entrances can be provided with exclusive fields of view. For example, the field of view can be determined by a respective field stop in a light path to the sensor. In one embodiment, a respective field of view is determined by a respective mirror and/or slit along a light path between a respective entrance and sensor. In another or further embodiment, respective baffles 13c,13e are used, e.g. around respective light entrances, to restrict light entering the instrument. Alternatively, it can also be envisaged to use one light entrance which views the object E in the first measurement window W1 and view the calibration light source C in the second measurement window W2.

In some embodiments, as illustrated e.g. in FIG. 2A, the first and second signals S1,S2 are measured in the first measurement window W1 while the calibration light source C illuminates the object E without illuminating the diffuser 12c. For example, the measurement device 10 comprises a first entrance, e.g. with a first baffle 13e, that faces the object E, during the first measurement window W1, while a second entrance, e.g. with a second baffle 13c is facing away from the calibration light source C.

In other or further embodiments, as illustrated e.g. in FIG. 2B, third and fourth signals S3,S4 are measured in the second measurement window W2 while the calibration light source C illuminates the diffuser 12c without illuminating the object E, or at least part of the object which is viewed by an entrance for the object light $L_E$. For example, the second baffle 13c faces the calibration light source C during the second measurement window W2. For example, the object E is not illuminated (dark) and/or the first baffle 13e faces away from the object E. In one embodiment, the second measurement window W2 is set during sunset or sunrise.

In other or further embodiments, as illustrated e.g. in FIG. 2C, the fifth signal S5 is measured in the third measurement window W3 while the calibration light source C is aligned to bypass the diffuser 12c. For example, the diffuser 12c comprises a gap or aperture 12h which allows a direct light path through the detector onto the reference detection element 15r during the third measurement window W3. For example, this direct light may overwhelm any indirect diffuse light which may also be generated by the diffuser 12c.

As will be appreciated, movement of the calibration light source C and/or object E with respect to the device 10, or vice versa can be used to change a respective view thereof through a respective baffle 13c, 13e and/or gap 12h. So, the device as described herein does not need to comprise moving parts. Alternatively, or additionally, it can also be envisaged to block or unblock respective light paths, e.g. during respective time windows.

Figure 3A:
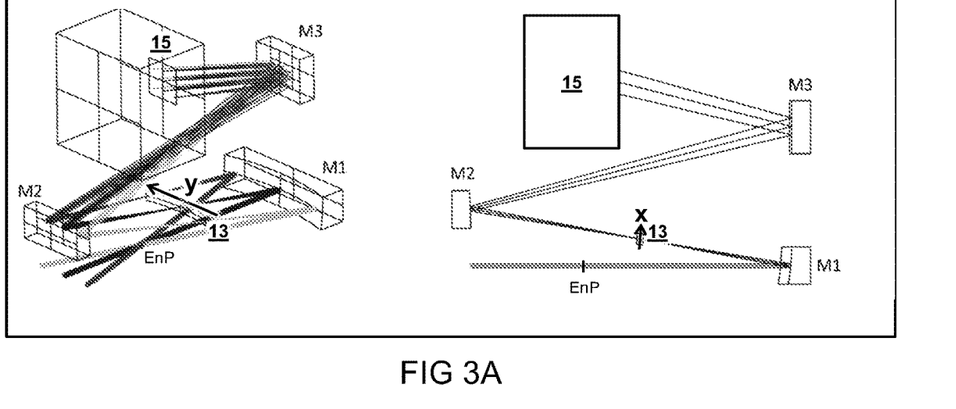
FIG. 3A illustrates an imaging system configured to project light onto a sensor array of the device.

FIG. 3A illustrates an imaging system configured to project light onto a sensor array 15.

In one embodiment, the imaging system comprises a first mirror M1 configured to image a first direction y of the object E along a length of a slit 13. In another or further embodiment, the first mirror M1 and/or further mirror is configured to image a second direction x of an entrance pupil EnP along a width of the slit 13. In another or further embodiment, the imaging system comprises second and third mirrors M2, M3 configured to image (light passing) the slit 13 onto the sensor array 15. For example, the image of the slit is expanded and/or spectrally resolved along the second direction x to cover different rows of pixels of the sensor array 15.

Figure 3B:
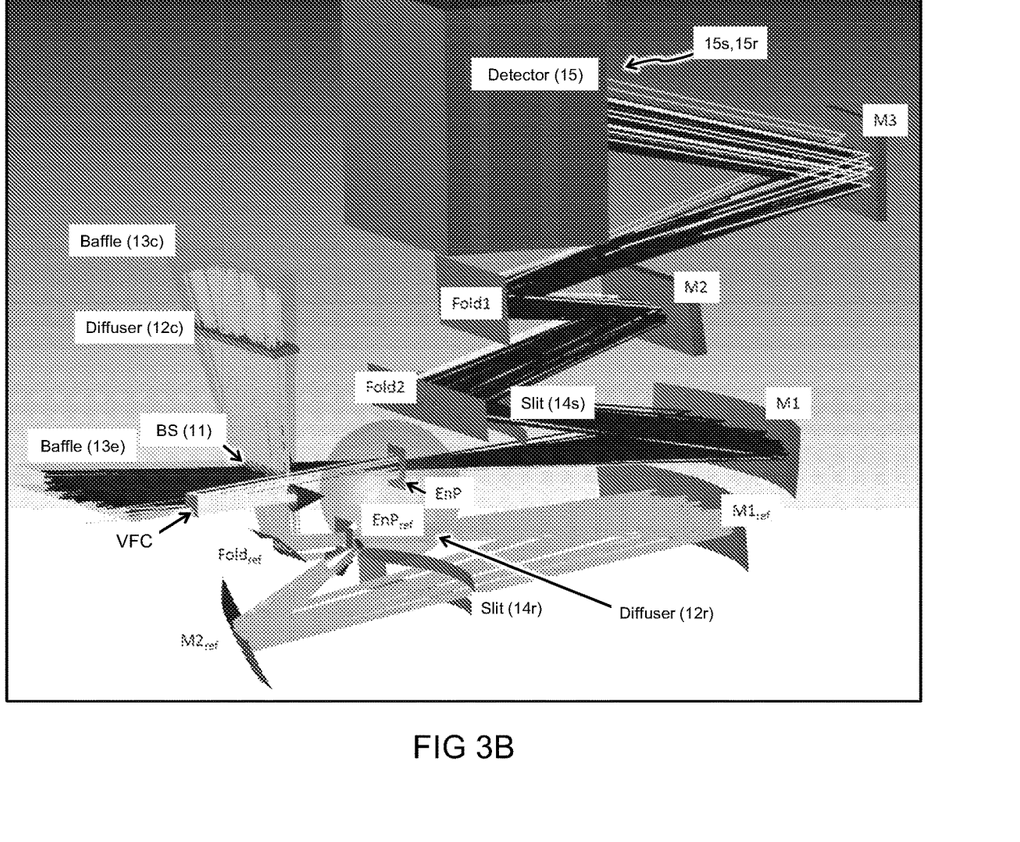
FIG. 3B illustrates various components in a specific implementation of the device.

FIG. 3B illustrates various components in a measurement and/or calibration device 10. In a preferred embodiment, the device comprises a beam splitter 11 and at least one sensor array 15 with sensing elements 15s,15r.

In some embodiments, the device 10 comprises a first entrance 13e (e.g. in the housing) configured to receive object light $L_E$ from the object E onto the beam splitter 11. For example, the beam splitter 11 is configured to cause the object light $L_E$ to be split into a first light beam $T \cdot L_E$ traveling along a signal path "Ps" and a second light beam $R \cdot L_E$ traveling along a reference path "Pr". In one embodiment, the device 10 comprises a first projection system M1, M2, M3 arranged along the signal path "Ps" and configured to project the first light beam $T \cdot L_E$ via the signal path "Ps" onto a respective signal detection element 15s of the at least one sensor array 15. For example, the signal detection element 15s is configured to measure a first signal S1 during a first measurement window W1. In another or further embodiment, the device 10 comprises a second projection system M1ref, M2ref arranged along the reference path "Pr" and configured to project the second light beam $R \cdot L_E$ via the reference path "Pr" onto a respective reference detection element 15r of the at least one sensor array 15. For example, the reference detection element 15r is configured to measure a second signal S2 in the first measurement window W1.

In some embodiments, the device 10 comprises a second entrance 13c (e.g. in the housing) configured to receive calibration light $L_C$ onto the beam splitter 11. For example, the beam splitter 11 is configured to cause the calibration light $L_C$ to be split into a third light beam $R \cdot L_C$ traveling along the signal path "Ps" and a fourth light beam $T \cdot L_C$ traveling along the reference path "Pr". In one embodiment, the first projection system is configured to project the third light beam $R \cdot L_C$ via the signal path "Ps" onto the respective signal detection element 15s. For example, the signal detection element 15s is configured to measure a third signal S3 in a second measurement window W2. In another or further embodiment, the second projection system is configured to project the fourth light beam $T \cdot L_C$ via the reference path "Pr" onto the respective reference detection element 15r. For example, the reference detection element 15r is configured to measure a fourth signal S4 in the second measurement window W2

In some embodiments, the device 10 comprises or couples to a processor configured, e.g. programmed, to determine a measurement value of the object light $L_E$ based on at least a combination of the measured first through fourth signals S1,S2,S3,S4; and possibly further signals. In other or further embodiments, the device 10 comprises a diffuser 12c between the second baffle 13c and the beam splitter 11. For example, the diffuser 12c is configured to diffuse light from a calibration light source C disposed in a first position. In one embodiment, the diffuser 12c comprises an aperture (not visible here) configured to bypass the diffuser 12c by a direct light ray from the calibration light source C disposed at a second position. The device can also comprise other or further components such as a reference slit 14r in the second projection system M1ref, M2ref. In some embodiments, the device comprises respective folding mirrors e.g. to compactify the device and/or fold the respective paths to coincide.

In some embodiments, the device 10 comprises a reference diffuser 12r, e.g. integrating sphere, between the beam splitter 11 and the sensor array 15. For example, the integrating sphere is configured to diffuse direct light from the calibration light source C, e.g. Sun, such that it fills the entrance pupil of the signal path (EnP). In one embodiment, light is collected and collimated from the output port of the integrating sphere by a Virtual Field Collimator mirror (VFC) and fed back into the signal path as a virtual field point. For example, the reference path becomes a new field angle that is outside the original field of view of the signal path.

For the purpose of clarity and a concise description, features are described herein as part of the same or separate embodiments, however, it will be appreciated that the scope of the invention may include embodiments having combinations of all or some of the features described. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise.

The invention claimed is:

1. A method for making a calibrated measurement of light from an object, the method comprising:
    during a first measurement window:
        receiving a beam of object light from the object onto a beam splitter causing the object light to be split into a first light beam traveling along a signal path and a second light beam traveling along a reference path,
        measuring a first signal by projecting the first light beam via the signal path onto a respective signal detection element, and
        measuring a second signal by projecting the second light beam via the reference path onto a respective reference detection element;
    during a second measurement window, that is temporally distinct from the first measurement window:
        receiving a beam of calibration light onto the beam splitter causing the calibration light to be split into a third light beam traveling along the signal path and a fourth light beam traveling along the reference path,
        measuring a third signal by projecting the third light beam via the signal path onto the respective signal detection element, and
        measuring a fourth signal, by projecting the fourth light beam via the reference path onto the respective reference detection element; and
    determining at least one measurement value of the object light,
    wherein the one measurement value is based on at least a combination of the measured first signal, second signal, third signal and fourth signal.

2. The method according to claim 1, wherein the at least one measurement value of the object light comprises one numerical value calculated as function of at least each of the measured first signal, second signal, third signal and fourth signal.

3. The method according to claim 1, wherein the measurement value of the object light is determined based at least on a combination of the first signal, the third signal, a reference value for the calibration light, and a beam splitting ratio of a reflection and transmission of the beam splitter,
    wherein the beam splitting ratio is determined based on a combination of the measured first signal, second signal, third signal and fourth signal.

4. The method according to claim 1, wherein the beam of object light from the object is received onto a first side of the beam splitter, and wherein the beam of calibration light is received onto a second side of the beam splitter, opposite the first side.

5. The method according to claim 4, wherein a device making the measurement comprises at least two light entrances,
    wherein a first light entrance is used for receiving the object light from the object into a housing of the device, and a second light entrance is used for receiving light from a calibration light source into the housing of the device,
    wherein the object light is received via a first baffle around the first entrance onto the first side of the beam splitter inside the housing, and the light from the calibration light source is received via a second baffle around the second entrance onto the second side of the beam splitter, and
    wherein the first light entrance and second light entrance provide respective light paths having an exclusive field of view of the object and calibration light source, respectively.

6. The method according to claim 1,
    wherein the third signal and the fourth signal are measured during the second measurement window while the calibration light source illuminates a diffuser either:
        without illuminating the object, or
        without illuminating at least a part of the object which is viewed by an entrance for the object light; and
    wherein the first signal and the second signal are measured during the first measurement window while the calibration light source illuminates the object without illuminating the diffuser.

7. The method according to claim 1, wherein the object light originates from an object or scene that is illuminated by a calibration light source which is directly or indirectly used to also generate the calibration light, and wherein the measurement value of the object light is determined relative to the calibration light.

8. The method according to claim 1, wherein the calibration light is received from a diffuser,
    wherein the diffuser is illuminated by direct reference light from a calibration light source to generate diffused reference light which is used as the calibration light, and
    wherein the measurement value of the object light is determined based on at least a combination of the measured first signal, second signal, third signal and fourth signal, a value of the direct reference light, and a diffusion characteristic of the diffuser.

9. The method according to claim 8, comprising:
    during a third measurement window, that is temporally distinct from the first measurement window and the second measurement window:
        receiving the direct reference light from the calibration light source onto the beam splitter, bypassing the diffuser, causing the direct reference light to be split into a fifth light beam traveling along the reference path, and
        measuring a fifth signal by projecting the fifth light beam via the reference path onto the respective reference detection element;
    wherein the diffusion characteristic of the diffuser is determined based on the fourth signal and the fifth signal.

10. The method according to claim 9, wherein the fifth signal is measured during the third measurement window while the calibration light source is aligned to bypass the diffuser via a gap in the diffuser.

11. The method according to claim 10, wherein the measurement value of the object light is determined:
    based on at least a combination of the measured first signal, second signal, third signal, fourth signal and fifth signal and a predetermined or separately measured value of the direct reference light; or
    relative to the direct reference light.

12. The method according to claim 1, wherein, for each wavelength of the first light beam being measured as a first signal, a corresponding wavelength of the second light beam is measured as a second signal.

13. The method according to claim 1, wherein the beam splitter has a substantially wavelength independent beam splitting ratio, at least for all wavelengths of light being measured.

14. The method according to claim 1, wherein, for all wavelengths being measured, the beam splitter has a beam splitting ratio between 0.5 and 2.

15. The method according to claim 1,
wherein the signal detection element is formed by a respective pixel of a sensor array, wherein the first light beam is projected onto the sensor array as an image of the object; and
wherein the reference detection element is formed by a respective pixel of the same or another sensor array, wherein the second light beam is projected onto the sensor array as a diffused image of the object.

16. The method according to claim 15,
wherein the first light beam is projected onto the sensor array as an image of the object along a first direction of the sensor array, and as an image of an entrance pupil along a second direction of the sensor array, transverse to the first direction; and
wherein the first light beam is spectrally resolved along the second direction onto the sensor array.

17. The method according to claim 16,
wherein the reference detection element is formed by a respective pixel along a column of pixels of the sensor array, wherein the second light beam is spectrally resolved along the column of pixels.

18. The method according to claim 17,
wherein at least one signal taken from the group consisting of the first signal and the third signal, measured by a respective signal detection element for a respective wavelength of the object light, is combined with at least one signal taken from the group consisting of the second signal, the fourth signal, and the fifth signal, measured by a respective reference detection element for the same wavelength of the calibration light.

19. A device for making a calibrated measurement of light from an object, the device comprising:
a processor configured to operate the device in temporally sequential measurement modes including a first measurement mode and a second measurement mode;
a beam splitter;
at least one sensor array with sensing elements;
a first entrance configured to, during operation of the processor in the first measurement mode, receive object light from the object onto the beam splitter causing the object light to be split into a first light beam traveling along a signal path and a second light beam traveling along a reference path;
a first projection system arranged along the signal path and configured to, during operation of the processor in the first measurement mode, project the first light beam via the signal path onto a respective signal detection element of the at least one sensor array for measuring a first signal;
a second projection system arranged along the reference path and configured to, during operation of the processor in the first measurement mode, project the second light beam via the reference path onto a respective reference detection element of the at least one sensor array for measuring a second signal;
a second entrance configured to, during operation of the processor in the second measurement mode that occurs at a different time than operation of the processor in the first measurement mode, receive calibration light onto the beam splitter causing the calibration light to be split into a third light beam traveling along the signal path and a fourth light beam traveling along the reference path;
wherein the first projection system is configured to, during operation of the processor in the second measurement mode, project the third light beam via the signal path onto the respective signal detection element for measuring a third signal;
wherein the second projection system is configured to, during operation of the processor in the second measurement mode, project the fourth light beam via the reference path onto the respective reference detection element for measuring a fourth signal; and
wherein the processor is configured to determine a measurement value of the object light based on at least a combination of the measured first signal, second signal, third signal and fourth signal.

20. A non-transitory computer-readable medium storing instructions that, when executed by the processor in the device according to claim 19, cause the processor to determine the measurement value of the object light based on a combination of the first signal, second signal, third signal and fourth signal.

* * * * *